(12) United States Patent
Kaspar et al.

(10) Patent No.: US 6,927,265 B2
(45) Date of Patent: Aug. 9, 2005

(54) MELT-PROCESSIBLE THERMOPLASTIC FLUOROPOLYMERS HAVING IMPROVED PROCESSING CHARACTERISTICS AND METHOD OF PRODUCING SAME

(75) Inventors: Harald Kaspar, Burgkirchen (DE); Klaus Hintzer, Kastl (DE); Tilman Zipplies, Burghausen (DE); Ralph Kaulbach, Burghausen (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/774,154

(22) Filed: Feb. 6, 2004

(65) Prior Publication Data

US 2004/0192868 A1 Sep. 30, 2004

(30) Foreign Application Priority Data

Mar. 25, 2003 (EP) ............................................ 03075848

(51) Int. Cl.⁷ ............................................ C08F 114/18
(52) U.S. Cl. ........................ 526/249; 524/544; 525/199
(58) Field of Search ........................ 526/249; 524/544; 525/199

(56) References Cited

U.S. PATENT DOCUMENTS 3,505,416 A 4/1970 Davis et al.
3,969,435 A 7/1976 Bailey et al.

(Continued)

FOREIGN PATENT DOCUMENTS

| EP | 0 075 312 A2 | 3/1983 |
| EP | 0 088 414 A2 | 9/1983 |
| EP | 0 208 305 A2 | 1/1987 |
| EP | 0208305 A2 * | 1/1987 |
| EP | 0 362 868 A2 | 4/1990 |
| EP | 0 845 147 B1 | 6/1998 |
| WO | WO 00/69969 | 11/2000 |
| WO | WO 02/00741 A1 | 1/2002 |

OTHER PUBLICATIONS

*Chemical Abstracts*, 1970, vol. 73, p. 294.
J. *Rheolog.* Acta 17 (1978) p. 415.
J. *Rheol.* 23 (1979) p. 421.
*Macromolecules* 2000, Wood–Adams et al., vol. 33, No. 20, pp. 7489–7499.
*Macromolecules* 2001, Garcia–Franco et al., vol. 34, No. 10, pp. 3115–3117.

*Primary Examiner*—David W. Wu
*Assistant Examiner*—Henry S. Hu
(74) *Attorney, Agent, or Firm*—Brian E. Szymanski

(57) ABSTRACT

The present invention provides a fluoropolymer that is melt-processible and thermoplastic and that has a melting point between 100° C. and 320° C. The fluoropolymer is derived from (a) one or more gaseous fluorinated monomers, (b) one or more modifiers selected from (i) olefins having a bromine or iodine atom bonded to a carbon of the double bond of the olefin, (ii) olefins corresponding to formula (I):

$$X^a{}_2C\!=\!CX^a\!-\!R_f\!-\!Br \qquad (I)$$

wherein each $X^a$ independently represents hydrogen, fluorine, bromine, chlorine or iodine, $R_f$ is a perfluoroalkylene group, typically having 1 to 8 carbon atoms, a perfluorooxyalkylene group or a perfluoropolyether group and (iii) mixtures thereof; and (c) optionally one or more comonomers selected from non-gaseous fluorinated monomers and non-fluorinated monomers. The resulting fluoropolymer has long chain branches. The invention further provides a method for making these polymers.

10 Claims, 2 Drawing Sheets

U.S. PATENT DOCUMENTS

| | | | |
|---|---|---|---|
| 4,001,351 A | | 1/1977 | Roura |
| 4,029,868 A | | 6/1977 | Carlson |
| 4,564,662 A | * | 1/1986 | Albin .......................... 526/247 |
| 4,600,651 A | | 7/1986 | Aufdermarsh et al. |
| 4,612,357 A | * | 9/1986 | Bekiarian et al. ........... 526/247 |
| 4,694,045 A | * | 9/1987 | Moore ........................ 525/276 |
| 4,743,658 A | | 5/1988 | Imbalzano et al. |
| 4,745,165 A | * | 5/1988 | Arcella et al. ............... 526/247 |
| 5,252,401 A | * | 10/1993 | Kitto et al. .................. 428/422 |
| 6,277,937 B1 | * | 8/2001 | Duvalsaint et al. ......... 526/255 |
| 6,734,254 B1 | * | 5/2004 | Worm et al. ................. 525/199 |

* cited by examiner

MELT-PROCESSIBLE THERMOPLASTIC FLUOROPOLYMERS HAVING IMPROVED PROCESSING CHARACTERISTICS AND METHOD OF PRODUCING SAME

This application claims priority from European Patent Application Ser. No. 03075848.6, filed Mar. 25, 2003.

FIELD OF THE INVENTION

This invention relates to melt-processible thermoplastic fluoropolymers, i.e. polymers having a fluorinated backbone. In particular, the present invention relates to such fluoropolymers having improved processing characteristics, e.g. in their extrusion into articles such as electrical wires. The invention also relates to a method of producing these polymers.

BACKGROUND OF THE INVENTION

Fluoropolymers have been long known and have been used in a variety of applications because of several desirable properties such as heat resistance, chemical resistance, weatherability, UV-stability etc. . . . The various applications of fluoropolymers are for example described in "Modem Fluoropolymers", edited by John Scheirs, Wiley Science 1997. Fluoropolymers include homo and co-polymers of a gaseous fluorinated olefin such as tetrafluoroethylene (TFE), chlorotrifluoroethylene (CTFE) and/or vinylidene fluoride (VDF) with one or more comonomers such as for example hexafluoropropylene (HFP) or perfluorovinyl ethers (PVE) or non-fluorinated olefins such as ethylene (E) and propylene (P). The term "copolymer" in connection with the present invention should generally be understood to mean a polymer comprising repeating units derived from the recited monomers without excluding the option of other further repeating units being present that derive from other monomers not explicitly recited. Accordingly, for example the term 'copolymer of monomers A and B' includes binary polymers of A and B as well as polymers that have further monomers other than A and B such as for example terpolymers.

Fluoropolymers include melt-processible and non-melt-processible polymers. For example, polytetrafluoroethylene and copolymers of tetrafluoroethylene with small amounts (e.g. not more than 0.5% by weight) of a comonomer are generally not melt-processible with conventional equipment used for the processing of thermoplastic polymers because of their high molecular weight and their high melt viscosity. Accordingly, for these non-melt-processible fluoropolymers, special processing techniques have been developed to allow forming these fluoropolymers into desired articles and shapes.

Melt-processible thermoplastic fluoropolymers are also known and these can be obtained from various combinations of fluorinated and/or non-fluorinated monomers. As they are melt-processible, they can be processed with equipment typically used for the processing, of thermoplastic polymers, such as e.g. molding or extrusion. Melt-processible thermoplastic fluoropolymers include generally amorphous fluoropolymers and fluoropolymers that have substantial crystallinity. Fluoropolymers that are generally amorphous are typically used to make fluoroelastomers by curing or vulcanizing the fluoropolymer. Although, the elastomeric properties generally are obtained after curing, the fluoropolymers used for making the fluoroelastomer are often also called fluoroelastomer. Melt-processible thermoplastic fluoropolymers that have substantial crystallinity and that accordingly have a clearly detectable and prominent melting point are known in the art as fluorothermoplasts. They typically have a melting point between 100° C. and 320° C. depending on their monomer composition.

Examples of fluorothermoplasts include copolymers of TFE and E (ETFE), copolymers of TFE and HFP (FEP), copolymers of TFE, HFP and VDF (THV) and perfluoroalkoxy copolymers (PFA). Examples of applications of fluorothermoplasts include for example coating applications such as for example for coating outdoor fabric and use as insulating material in wire and cable insulation. Further applications of fluorothermoplasts include making of tubes such as for example fuel hoses, extrusion of films and injection molded articles.

The rate of extrusion of fluorothermoplast is limited to the speed at which the polymer melt undergoes melt fracture. If the rate of extrusion exceeds the rate at which melt fracture occurs (known as critical shear rate), an undesired rough surface of the extruded article is obtained. Using an extrusion die with a relatively large orifice and then drawing the extruded melt to the desired final diameter may increase the process rate of fluorothermoplasts. Herein, the melt draw is commonly characterized by the draw down ratio calculated as the ratio of the cross-sectional area of the die opening to the ratio of the cross-sectional area of the finished extrudate. To obtain a high draw down ratio e.g. in the order of 85 to 100, the polymer melt should exhibit a sufficiently high elongational viscosity. Otherwise the cone stability of the polymer melt in the extrusion will be insufficient, which results in undesired diameter variations of the extruded article as well as frequent cone-breaks.

Accordingly, there exists a continuous need for fluorothermoplasts that can be melt-processed at higher shear rates and that have a high elongational viscosity. Various attempts have been made in the art to obtain such fluorothermoplasts or compositions thereof that can be faster processed.

A known approach in the art is to substantially broaden the molecular weight distribution (MWD) thereby increasing the critical shear rate. As disclosed in DE-A-2613795, DE-A-2613642, EP-A-88414 and EP-A-362868, FEP polymers that have a broad MWD ensure relatively fast processing at relatively high shear rates. WO 00/69969 teaches that the critical shear rate of a THV terpolymer can be efficiently increased if the fluoropolymer composition contains a small fraction of ultra high molecular weights (besides a larger fraction of low molecular weights). The MWD of such a fluoropolymer composition appears considerably asymmetrical. Unfortunately, the gain in critical shear rate is usually to the expense of weaker overall mechanical properties such as flex life endurance.

In DE-A-2710501, EP-A-75312, WO 02/00741 and EP 0845147, the modification with a particular comonomer, such as perfluoro vinylethers (PVE) is taught to yield retention of necessary mechanical properties while increasing the processing speed of fluorothermoplasts. But, the additional incorporation of PVEs into fluorothermoplasts increases the manufacturing costs, which may not be desired. Furthermore the formation of die deposits ("die drool") may occur, particularly with a broad MWD of the fluorothermoplast. In fast extrusion procedures, such as wire & cable insulation, large accumulation of die deposits separate from the die and may cause break-off of the melt cone ("cone-break") and thus interruption of the production, and also interruption of the continuous cable.

It can thus be seen from the above that the solutions taught in the prior art have caused other disadvantages such as weaker mechanical properties, higher manufacturing costs and/or other process limitations. Further, the elongational viscosity characteristics (which are of primary importance for processes involving high draw-down ratios) are only little improved by a broad MWD taught for improving the critical shear rate.

In EP 208305 it is taught that the processing of thermoplastic, non-thermosettable copolymers of tetrafluoroethylene can be improved by copolymerizing a small amount of a iodo(perfluoroalkyl)ethylene. In particular, it is taught that the use of 4-iodo-3,3,4,4-tetrafluorobutene-1 (ITFB) increases the critical shear rate by a factor of 2 to 3 and also improves the melt tension of the fluoropolymer. It is speculated in this publication that the effect is due to long chain branching being introduced into the polymer through the ITFB. Thus, the formed fluoropolymer would be non-linear as opposed to same fluoropolymers made without ITFB which are linear. Unfortunately, the making of ITFB involves the use of highly toxic intermediates.

Accordingly, the need still exists to find further fluorothermoplasts that have high critical shear rates and/or high draw-down ratios preferably without causing other disadvantages such as reduced mechanical properties, increased cost and/or causing other processing disadvantages. It would further be desired that the making of such fluorothermoplasts does not involve the use of highly toxic compounds or compounds the manufacturing of which involves toxic components. Desirably, the thermal stability of the fluorothermoplasts is unaffected or improved and the fluorothermoplast can be readily manufactured in an environmentally friendly way preferably through aqueous emulsion polymerization.

SUMMARY OF THE INVENTION

In one aspect, the present invention provides a fluoropolymer that is melt-processible and thermoplastic and that has a melting point between 100° C. and 320° C. The fluoropolymer is derived from (a) one or more gaseous fluorinated monomers, (b) one or more modifiers selected from (i) olefins having a bromine or iodine atom bonded to a carbon of the double bond of the olefin, (ii) olefins corresponding to formula (I):

$$X^a{}_2C=CX^a-R_f-Br \qquad (I)$$

wherein each $X^a$ independently represents hydrogen, fluorine, bromine, chlorine or iodine, $R_f$ is a perfluoroalkylene group, typically having 1 to 8 carbon atoms, a perfluorooxyalkylene group or a perfluoropolyether group and (iii) mixtures thereof; and (c) optionally one or more comonomers selected from non-gaseous fluorinated monomers and non-fluorinated monomers. The resulting fluoropolymer has long chain branches.

It was found that such polymers have an increased critical shear rate and they may have a high melt tension at a given melt viscosity making them particularly suitable in applications with high draw down ratios. Further, the polymers can be readily made in a convenient, reliable and reproducible way using environmentally friendly manufacturing processes such as aqueous emulsion polymerization. Additionally, the modifiers used in the fluoropolymer, are generally commercially available, and typically are not highly toxic and their method of making generally does not involve highly toxic compounds.

In a further aspect, there is provided a method for making a fluoropolymer that is melt-processible and thermoplastic and that has a melting point between 100° C. and 320° C. The method comprises a polymerization, preferably an aqueous emulsion polymerization, of (a) one or more gaseous fluorinated monomers with (b) one or more modifiers selected from (i) olefins having a bromine or iodine atom bonded to a carbon of the double bond of the olefin, (ii) olefins corresponding to formula (I):

$$X^a{}_2C=CX^a-R_f-Br \qquad (I)$$

wherein each $X^a$ independently represents hydrogen, fluorine, bromine, chlorine or iodine, $R_f$ is a perfluoroalkylene group, typically having 1 to 8 carbon atoms, a perfluorooxyalkylene group or a perfluoropolyether group and (iii) mixtures thereof; and (c) optionally one or more comonomers selected from non-gaseous fluorinated monomers and non-fluorinated monomers, whereas the amounts of the gaseous fluorinated monomer and optional comonomers are selected such so as to obtain a melt-processible thermoplastic fluoropolymer having a melting point between 100 and 320° C. and wherein the one or more modifiers are used in amount of not more than 0.3% by weight based on the total weight of monomers fed to the polymerization.

In yet a further aspect, the present invention provides the use of the above described thermoplastic melt-processible fluoropolymers in the extrusion of an article, in particular in the extrusion of wires and cables.

In connection with the present invention, a fluoropolymer is considered to be melt-processible if the melt viscosity of the polymer is low enough such that the polymer can be processed in conventional extrusion equipment used to extrude polymers. This typically requires that the melt viscosity at the processing temperature e.g. 250 to 400° C., be no more than $10^6$ Pa*s, preferably $10^2$ to $10^5$ Pa*s.

DETAILED DESCRIPTION OF THE INVENTION

Figure 1:
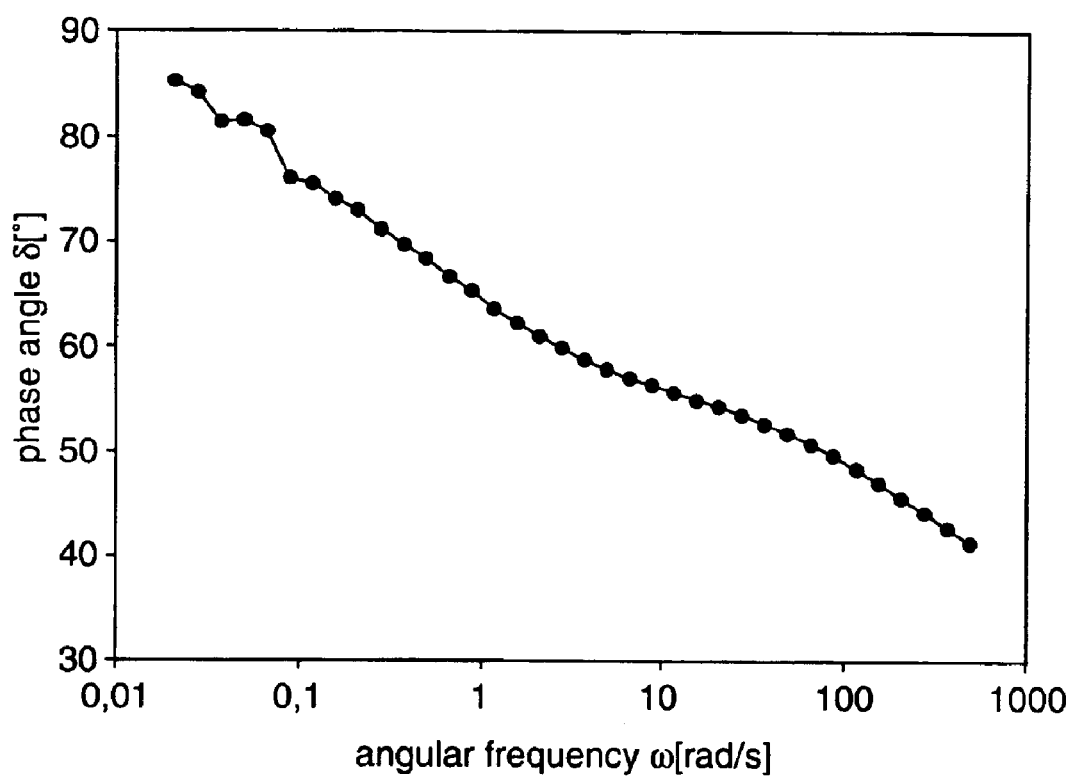
FIG. 1 is a graphical representation of phase angle versus angular frequency of a fluorothermoplast of the present invention.

In one embodiment of the method of making the thermoplastic melt-processible fluoropolymers, hereinafter fluorothermoplasts, an olefin that has on at least one carbon of the double bond a bromine or iodine atom is used as a modifier. The olefin may apart from containing Br and/or I atoms, be non-fluorinated, i.e. not contain fluorine atoms, may be partially fluorinated, i.e. some but not all hydrogen atoms have been replaced with fluorine atoms, or the olefin may be a perfluorinated compound in which all hydrogen atoms have been replaced with fluorine atoms except for those replaced with I or Br.

In a particular embodiment, the olefin corresponds to the general formula:

$$X_2C=CXZ \qquad (II)$$

wherein each X may be the same or different and is selected from the group consisting of hydrogen, F, Cl, Br and I, with the proviso that at least one X represents Br or I, Z represents hydrogen, F, Cl, Br, I, a perfluoroalkyl group, a perfluoroalkoxy group or a perfluoropolyether group. Examples of perfluoroalkyl groups include linear or branched perfluoroalkyl groups having between 1 and 8 carbon atoms, for example 1 to 5 carbon atoms. Examples of perfluoroalkoxy groups include those that have between 1 and 8 carbon atoms, for example between 1 and 5 carbon atoms in the alkyl group and whereby the alkyl group may be linear or branched. Examples of perfluoropolyether groups include those corresponding to the formula:

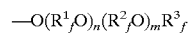

$$-O(R^1{}_fO)_n(R^2{}_fO)_mR^3{}_f$$

wherein $R^1{}_f$ and $R^2{}_f$ are each linear or branched perfluoroalkylene groups of 1–6 carbon atoms, in particular 2 to 6 carbon atoms, m and n are independently 0–10 with m+n being at least 1 and $R^3{}_f$ is a perfluoroalkyl group of 1–6 carbon atoms.

In a particular embodiment, olefins of formula (II) can be employed wherein X is selected from hydrogen, F and Br with the proviso that at least one X represents Br and Z is hydrogen, F, Br, a perfluoroalkyl group or a perfluoroalkoxy group. Specific examples of olefins that may conveniently be used include 1-bromo-1,2,2,-trifluoroethylene, bromotrifluoroethylene (referred as BTFE), vinylbromide, 1,1-dibromoethylene, 1,2-dibromoethylene and 1-bromo-2,3,3,3-tetrafluoro-propene. Generally preferred is 1-bromo-2,2-difluoroethylene (BDFE). This compound is prepared according to U.S. Pat. No. 3,505,416 by contacting a solution of 1,1-difluoro-1,2,2,2-tetrabromoethane in a lower alcohol with excess granulated zinc or magnesium (also see Chemical Abstracts 1970, Vol. 73, 294). This synthesis does not include highly toxic intermediates. Further BDFE is commercially available. It is of course also possible to use a mixture of the bromine or iodine containing olefins.

In a further embodiment of the present invention, the modifier used corresponds to the formula:

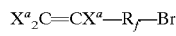  (I)

wherein each $X^a$ independently represents hydrogen, fluorine, bromine, chlorine or iodine; $R_f$ is a perfluoroalkylene group, typically having 1 to 8 carbon atoms, a perfluorooxyalkylene group or or a perfluoropolyether group. The bromine may be contained in terminal position of the $R_f$ group but can alternatively also be contained along the chain of the $R_f$ group. Examples of olefins according to formula (I) include:

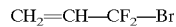

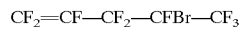

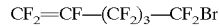

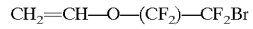

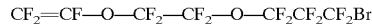

In still a further embodiment of the invention, a mixture of olefins according to formula (I) with one or more olefins having a bromine or iodine atom at the double bond is used.

The fluorothermoplasts produced with the method according to the invention have so-called long chain branches. That is the polymers are not linear in that one or more branches from the backbone are present. Without intending to be bound by theory, it is believed that these branches result from abstraction of the bromine or iodine atom from the modifier once it is polymerized into the backbone of the fluoropolymer. The so produced radical on the backbone may then cause further polymerization with the result that a polymeric chain is formed as a branch on the backbone. Such branches are known in the art as long chain branches or LCBs. This branching process may be depicted for an olefin having a bromine on its double bond as follows:

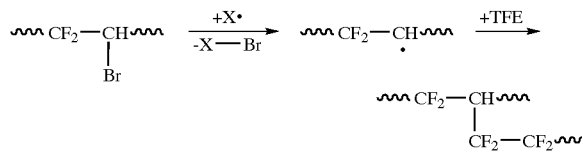

wherein X• is a radical species present in the polymerization.

Indications that the fluorothermoplasts have LCBs were found by examining the rheology data obtained on the melt of the fluorothermoplasts. As disclosed by Wood-Adams et al. (Macromolecules 2000, 33, No.20, 7489–7499), in a plot of the phase angle δ versus the measurement frequency ω, polymers that have long chain branches exhibit a plateau in the function of δ(ω) whereas linear polymers do not have such a plateau. The phase angle δ is the arctan(G"/G') wherein G" represents the loss modulus (Pa) and G' represents the storage modulus (Pa). A representative plot for a fluorothermoplast obtained with the invention is shown in FIG. 1. As can be seen a plateau (10) appears in this plot which indicates the presence of LCBs.

According to Garcia-Franco et al. (Macromolecules 2001, 34, No.10, 3115–3117), the plateau in the aforementioned plot will shift to lower phase angles δ when the amount of LCBs occurring in the polymer sample increases. Dividing the phase angle at which the plateau occurs by a phase angle of 90°, one obtains the critical relaxation exponent n which can then be used to calculate a gel stiffness using the equation:

$$\eta^*(\omega)=S\Gamma(1-n)\omega^{n-1}$$

wherein η* represents the complex viscosity (Pa*s), ω represents the frequency, S is the gel stiffness and n is the critical relaxation exponent. Fluorthermoplast produced with the method of the invention have a gel stiffness of more than 150 Pa*s$^n$, preferably at least 300 and more preferably at least 500. The gel stiffness is determined at the test temperature typically used for determining the Melt Flow Index and for many fluoropolymers is specified in the norm ISO 12086-2. For example the test temperature for FEP and PFA is 372° C. and that for ETFE is 297° C. THV type of fluoropolymers are typically measured at a temperature of 265° C. The critical relaxation exponent n for the fluorothermoplasts is less than 1 and more than 0, generally, n will be between 0.3 and 0.92, preferably between 0.35 and 0.85. The closer n is to 1, the fewer long chain branches will be present.

The level of long chain branches and the gel stiffness S of the fluorothermoplasts can be readily and reproducibly controlled by varying the amount of the modifier used. Thus, in general, a lower amount of the modifier will produce a lower gel stiffness S and a larger amount of modifier will increase the gel stiffness. It should however be avoided to use a too large amount of the modifier as this may result in a brittle and gelled product. The appropriate amounts of modifier needed, can be readily established through routine experimentation. Although other factors, such as the polymerization conditions may to some extent also influence the level of long chain branches and the gel stiffness S, the amount of the modifier needed will typically be not more than 0.3% by weight based on the total weight of monomers fed to the polymerization. A useful amount may be from 0.01% to 0.3% by weight, preferably from 0.05% to 0.25% by weight. The modifier can be added at the start of the polymerization and/or may be added during the polymerization in a continuous way and/or portion-wise. Preferably, the modifier is continuously fed to the polymerization.

The fluorothermoplasts obtained in the present invention are not curable or only marginally curable using a peroxide cure system as is sometimes used in the making of fluoroelastomers despite the fact that the modifier contains bromine and/or iodine atoms which would introduce bromine and/or iodine atoms into the polymer chain. However, the amount of the modifier used is so small that any bromine or iodine atom that may remain present after the polymerization reaction, is insufficient to allow any substantial curing as is observed and required in the making of fluoroelastomers.

The fluorothermoplasts can be obtained with any of the known polymerization techniques including solution polymerization and suspension polymerization. The fluorothermoplasts are preferably made through an aqueous emulsion polymerization process, which can be conducted in a known manner. The reactor vessel for use in the aqueous emulsion polymerization process is typically a pressurizable vessel capable of withstanding the internal pressures during the polymerization reaction. Typically, the reaction vessel will include a mechanical agitator, which will produce thorough mixing of the reactor contents and heat exchange system. Any quantity of the fluoromonomer(s) may be charged to the reactor vessel. The monomers may be charged batchwise or in a continuous or semicontinuous manner. By semi-continuous is meant that a plurality of batches of the monomer are charged to the vessel during the course of the polymerization. The independent rate at which the monomers are added to the kettle will depend on the consumption rate of the particular monomer with time. Preferably, the rate of addition of monomer will equal the rate of consumption of monomer, i.e. conversion of monomer into polymer.

The reaction kettle is charged with water, the amounts of which are not critical. To the aqueous phase there is generally also added the fluorinated surfactant, typically a non-telogenic fluorinated surfactant. Such fluorinated surfactant is typically used in amount of 0.01% by weight to 1% by weight. Suitable fluorinated surfactants include any fluorinated surfactant commonly employed in aqueous emulsion polymerization. Particularly preferred fluorinated surfactants are those that correspond to the general formula:

wherein Y represents hydrogen, Cl or F; $R_f$ represents a linear or branched perfluorinated alkylene having 4 to 10 carbon atoms; Z represents $COO^-$ or $SO_3^-$ and M represents an alkali metal ion or an ammonium ion. Most preferred fluorinated surfactants for use in this invention are the ammonium salts of perfluorooctanoic acid and perfluorooctane sulphonic acid. Mixtures of fluorinated surfactants can be used.

A chain transfer agent can be charged to the reaction kettle prior to the initiation of the polymerization. Useful chain transfer agents include $C_2$–$C_6$ hydrocarbons such as ethane, alcohols, ethers, esters including aliphatic carboxylic acid esters and malonic esters, ketones and halocarbons. Particularly useful chain transfer agents are dialkylethers such as dimethyl ether and methyl tertiary butyl ether. Further additions of chain transfer agent in a continuous or semi-continuous way during the polymerization may also be carried out. For example, a fluoropolymer having a bimodal molecular weight distribution is conveniently prepared by first polymerizing fluorinated monomer in the presence of an initial amount of chain transfer agent and then adding at a later point in the polymerization further chain transfer agent together with additional monomer.

The polymerization is usually initiated after an initial charge of monomer by adding an initiator or initiator system to the aqueous phase. For example peroxides can be used as free radical initiators. Specific examples of peroxide initiators include, hydrogen peroxide, diacylperoxides such as diacetylperoxide, dipropionylperoxide, dibutyrylperoxide, dibenzoylperoxide, benzoylacetylperoxide, diglutaric acid peroxide and dilaurylperoxide, and further water soluble per-acids and water soluble salts thereof such as e.g. ammonium, sodium or potassium salts. Examples of per-acids include peracetic acid. Esters of the peracid can be used as well and examples thereof include tert.-butylperoxyacetate and tert.-butylperoxypivalate. A further class of initiators that can be used are water soluble azo-compounds. Suitable redox systems for use as initiators include for example a combination of peroxodisulphate and hydrogen sulphite or disulphite, a combination of thiosulphate and peroxodisulphate or a combination of peroxodisulphate and hydrazine. Further initiators that can be used are ammonium- alkali- or earth alkali salts of persulfates, permanganic or manganic acid or manganic acids. The amount of initiator employed is typically between 0.03 and 2% by weight, preferably between 0.05 and 1% by weight based on the total weight of the polymerization mixture. The full amount of initiator may be added at the start of the polymerization or the initiator can be added to the polymerization in a continuous way during the polymerization until a conversion of 70 to 80%. One can also add part of the initiator at the start and the remainder in one or separate additional portions during the polymerization. Accelerators such as for example water-soluble salts of iron, copper and silver may preferably also be added.

During the initiation of the polymerization reaction, the sealed reactor kettle and its contents are conveniently pre-heated to the reaction temperature. Polymerization temperatures are from 20° C. to 150° C., preferred from 30° C. to 110° C. and most preferred from 40° C. to 100° C. The polymerization pressure is typically between 4 and 30 bar, in particular 8 to 20 bar. The aqueous emulsion polymerization system may further comprise auxiliaries, such as buffers and complex-formers.

The amount of polymer solids that can be obtained at the end of the polymerization is typically between 10% and 45% by weight, preferably between 20% and 40% by weight and the average particle size of the resulting fluoropolymer is typically between 50 nm and 500 nm.

The (aqueous emulsion) polymerization process comprises the polymerization of one or more gaseous fluorinated monomer which may be perfluorinated or not. Examples of a gaseous fluorinated monomer include tetrafluoroethylene, chlorotrifluoroethylene, vinylidene fluoride, perfluoroalkyl vinyl monomers such as hexafluoropropylene, fluorinated allyl ethers, in particular perfluorinated allyl ethers and fluorinated vinyl ethers, in particular perfluorovinyl ethers such as perfluoromethyl vinyl ether. Comonomers that can be used for copolymerization with the gaseous fluorinated monomers include non-gaseous fluorinated monomers, i.e. fluorinated monomers that under the conditions of polymerization are in a liquid phase and non-fluorinated monomers such as ethylene and propylene.

Examples of perfluorovinyl ethers that can be used in the process of the invention include those that correspond to the formula:

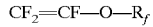

wherein $R_f$ represents a perfluorinated aliphatic group that may contain one or more oxygen atoms. Particularly preferred perfluorinated vinyl ethers correspond to the formula:

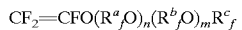

wherein $R^a_f$ and $R^b_f$ are different linear or branched perfluoroalkylene groups of 1–6 carbon atoms, in particular 2 to 6 carbon atoms, m and n are independently 0–10 and $R^c_f$ is a perfluoroalkyl group of 1–6 carbon atoms. Specific examples of perfluorinated vinyl ethers include perfluoro methyl vinyl ether (PMVE), perfluoro n-propyl vinyl ether (PPVE-1), perfluoro-2-propoxypropylvinyl ether (PPVE-2), perfluoro-3-methoxy-n-propylvinyl ether, perfluoro-2-methoxy-ethylvinyl ether and $CF_3$—$(CF_2)_2$—O—CF $(CF_3)$—$CF_2$—O—$CF(CF_3)$—$CF_2$—O—$CF$=$CF_2$. Some of the aforementioned perfluorovinyl ethers will be liquid under the conditions of polymerization and are thus non-gaseous fluorinated monomers. Suitable perfluoroalkyl vinyl monomers correspond to the general formula:

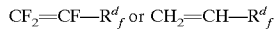

wherein $R^d_f$ represents a perfluoroalkyl group of 1 to 10, preferably 1 to 5 carbon atoms. A typical example of a perfluoroalkyl vinyl monomer is hexafluoropropylene.

Examples of fluoropolymers that may be produced with the process according to the invention include a copolymer of tetrafluoroethylene and hexafluoropropylene, a copolymer of tetrafluoroethylene and perfluorovinyl ether (e.g. PMVE, PPVE-1, PPVE-2 or a combination of PPVE-1 and PPVE-2), a copolymer of vinylidene fluoride and hexafluoropropylene, a copolymer of tetrafluoroethylene and vinylidene fluoride, a copolymer of chlorotrifluoroethylene and vinylidene fluoride, a copolymer of tetrafluoroethylene and ethylene, a copolymer of tetrafluoroethylene and propylene, a copolymer of vinylidene fluoride and perfluorovinyl ether (e.g. PMVE, PPVE-1, PPVE-2 or a combination of PPVE-1 and PPVE-2), a terpolymer of tetrafluoroethylene, hexafluoropropylene and perfluorovinyl ether (e.g. PMVE, PPVE-1, PPVE-2 or a combination of PPVE-1 and PPVE-2), a terpolymer of tetrafluoroethylene, ethylene or propylene and perfluorovinyl ether (e.g. PMVE, PPVE-1, PPVE-2 or a combination of PPVE-1 and PPVE-2), a terpolymer of tetrafluoroethylene, ethylene or propylene and hexafluoropropylene, a terpolymer of tetrafluoroethylene, vinylidene fluoride and hexafluoropropylene, a terpolymer of vinylidene fluoride, tetrafluoroethylene and perfluorovinyl ether (e.g. PMVE, PPVE-1, PPVE-2 or a combination of PPVE-1 and PPVE-2), and a copolymer of a copolymer of tetrafluoroethylene, ethylene or propylene, hexafluoropropylene and perfluorovinyl ether (e.g. PMVE, PPVE-1, PPVE-2 or a combination of PPVE-1 and PPVE-2).

As mentioned above, the modifier used in the invention may be added to the polymerization vessel in portions or in a continuous way. The modifier may be fed to the polymerization from a separate inlet or storage cylinder. Alternatively, a mixture of the modifier with a fluorinated monomer may be used to feed the modifier to the polymerization. The latter method may provide improved homogeneous incorporation of the modifier into the polymer leading to a more uniform distribution of long chain branches. Suitable fluorinated monomers with which the modifier can be admixed to feed to the polymerization include fluorinated olefins such as CTFE, HFP and perfluorovinyl ethers such as perfluoromethyl vinyl ether.

Preferably, the isolated perfluorinated fluorothermoplasts such as PFA and FEP may be post-fluorinated subsequent to the polymer workup. During post-fluorination, any remaining hydrogen, bromine and/or iodine atoms in the fluoropolymer can be replaced with fluorine atoms. Further, any unstable end groups such as carboxylic acid groups, COF groups, amide groups, —$CF_2CH_2OH$ etc., which may during melt processing of the fluoropolymer decompose and form HF, can be converted into stable $CF_3$ groups. Preferably, the post-fluorination is conducted under conditions sufficient such that not more than 30, preferably not more than 20 and most preferably not more than 10 unstable end groups per million carbon atoms are present in the fluorothermoplast. Accordingly, a highly inert perfluorinated fluorothermoplast may thereby be obtained. Post-fluorination of the dried polymer agglomerate or the melt pellets may be carried out according to any of the procedures known in the art. For example, post-fluorination may be carried out by any fluorine radical generating compound but is preferably carried out with fluorine gas. Thus, the fluorothermoplast may be contacted with the fluorine gas, which is preferably diluted with an inert gas such as nitrogen. Typical fluorination conditions include the use of a fluorine/inert gas ratio of 1 to 100 volume %, typically 5 to 25%, a temperature of between 100 and 250° C. and a gas pressure of 0.5 to 10 bar absolute. Preferably the fluorothermoplast is agitated during fluorination. After the fluorination, the fluorothermoplast is typically sparged with an inert gas such as nitrogen to reduce the level of extractable fluorides in the fluorothermoplast to a desired level, e.g. less than 3 ppm by weight, preferably less than 1 ppm by weight.

The fluorothermoplasts are suitable for making a variety of articles and are in particular suitable in extrusion processing to produce articles. For example, the fluorothermoplasts can be used to make wires and cables in which they may present the advantage of having a high critical shear rate combined with a high elongational viscosity so that they can be rapidly processed and can be processed with high draw down ratios that may be used in wire and cable extrusion. Generally, these properties are obtained without sacrificing the mechanical properties. Furthermore because of the strain hardening properties that the fluorothermoplasts according to the invention may possess, any diameter fluctuations that may result at high processing speeds with a high draw down ratio in cable or wire extrusion generally disappear during the cable extrusion with the high drawing force applied to the cable or wire. This is to be contrasted with fluorothermoplasts that are linear in which case breaking of the cable insulation would occur under high drawing forces at those spots were the cable diameter is low as a result of diameter fluctuations occurring in the drawing process.

The fluorothermoplasts may further be used in coating applications such as for example for coating outdoor fabric, making of tubes such as for example fuel hoses, extrusion of films and injection molded articles.

The invention is further illustrated with reference to the following examples without however the intention to limit the invention thereto.

EXAMPLES

Methods

The melt flow index (MFI), reported in g/10 min, was measured according to DIN 53735, ISO 12086 or ASTM D-1238 at a support weight of 5.0 kg and a temperature of 265° C., or 372° C. alternatively. The MFI was obtained with a standardized extrusion die of 2.1 mm diameter and a length of 8.0 mm.

A strain controlled ARES rheometer of Rheometry Scientific was used to record the dynamic mechanical data of the fluoropolymer in frequency sweep experiments. For the various frequency sweeps at the specific temperature in nitrogen atmosphere, a 25 mm parallel plate geometry was used and a strain typically ranging from 1 to 20% was applied. Zero shear viscosities $\eta_0$, reported in Pa*s, were extrapolated using the 4 parameter Carreau fit function of the orchestrator software. The phase angle at gel point $\delta_c$, needed to evaluate the relaxation exponent n, is selected from the frequency where the the $1^{st}$ derivative of $\delta(\omega)$ passes the maximum or the $2^{nd}$ derivative passes zero.

Melting peaks of the fluororesins were determined according to ASTM 4591 by means of Perkin-Elmer DSC 7.0 under nitrogen flow and a heating rate of 10° C./min. The indicated melting points relate to the melting peak maximum.

The latex particle size determination was conducted by means of dynamic light scattering with a Malvern Zetazizer 1000 HSA in accordance to ISO/DIS 13321. The reported average particle size is the z-average. Prior to the measurements, the polymer latexes as yielded from the polymerizations were diluted with 0.001 mol/L KCl-solution, the measurement temperature was 20° C. in all cases.

Solution viscosities of diluted polymer solutions was determined on a 0.16% polymer solution in methylethylketone (MEK) at 35° C. in accordance to DIN 53726. A Connon-Fenske-Routine-Viskosimeter (Fa. Schott, Mainz/Germany) fulfilling ISO/DIS 3105 and ASTM D 2515 was used for the measurements, the Hagenbach correction was applied. The so-obtained reduced viscosities $\eta_{red.}$ were converted into the intrinsic viscosity $[\eta]$ using the Huggins equation ($\eta_{red.} = [\eta] + k_H \times [\eta]^2 \times c$) and a Huggins constant of $k_H = 0.34$.

Critical shear rates, reported in reciprocal seconds (s$^{-1}$), were determined at 265° C., or 372° C. alternatively, according to ASTM D-3835–96 or ISO 11443 using a Goettfert capillary rheometer model "Rheotester 1000". A variety of plunger speeds were used in ascending order (usually starting from 10 s$^{-1}$ and subsequently increasing by factor of 1.4). The melt was extruded through a capillary having the geometry of 1 mm diameter, 30 mm length and 90° entry angle. When constant flow conditions had been reached, which was monitored by a 500 bar pressure sensor, the extruded monofil was taken and visually inspected. The last shear rate at which melt fracture was not yet visual as well as the first shear rate at which melt fracture was visually detectable were recorded.

Transient uniaxial extensional measurements were obtained at 170° C. using a Münstedt type elongational rheometer (described in *J. Rheolog. Acta* 17 (1978), p. 415 and *J. Rheol.* 23 (1979), p. 421). The transient extensional data were collected over the extensional rate range 0.01–0.5 s$^{-1}$. The maximum Hencky (true) strain achievable with this device is approximately 3.0 using cylindrical test specimens with initial nominal length of 22 mm and 4.8 mm diameter. These cylindrical test specimens were obtained by extruding monofils from the polymer with a standard MFI instrument at 190° C. using a 4 mm diameter dye and 10.6 kg support weight. They were then bonded to the test clips using high-temperature UHU epoxy, mounted to the rheometer, and immersed to a test fluid bath at 170° C. The test fluid consisted of perfluoropolyether.

At a batch temperature of 170° C., the volume swell of fluoropolymer with the fluid (1.5%) as well as the difference of specific volumes of the fluid (0.630 g/cm$^3$) and the fluoropolymer (0.605 g/cm$^3$) is neglectible low (4% deviation). Once thermal equilibrium was achieved, an applied extensional rate deformed the sample and the resulting force was monitored using a leaf spring-LVDT assembly. The so-obtained elongational viscosities $\eta_e$ are reported in Pa*s as a function of time (in sec).

Polymer end group detection was conducted in analogy to the method described in U.S. Pat. No. 4,743,658. Thin films (0.25–0.30 mm) are moulded at 350° C. using a heated platen press. The films are scanned on a Nicolet Model 510 Fourier Transform infrared spectrometer. 16 scans are collected before the transform is performed, all other operational settings used were those provided as default settings in the Nicolet control software. Similarly, a film of a reference material known to have none of the end groups to be analysed ("Teflon PFA 350 T") is moulded and scanned. The reference absorbance spectrum is subtracted from the sample absorbance, using the interactive subtraction mode of the software. The —CF$_2$ overtone band at 4.25 micrometers is used to compensate for thickness differences between sample and reference during this interactive subtraction. The difference spectrum, in two ranges—5.13 to 5.88 micrometers (1950 to 1700 wave numbers) and 2.70 to 345 micrometers (3700 to 2900 wave numbers)—represents the absorbances due to reactive end groups. The number of end groups per million carbon atoms are determined via the equation:

ends/10$^6$ carbons=absorbance×CF/film thickness in mm

The calibration factors used to calculate the number of end groups per million carbon atoms are summarized in the following table:

| End group | Wavelength | Calibration Factor (CF) |
| --- | --- | --- |
| —COF | 5.31 micrometers | 440 |
| —CH$_2$OH | 2.75 micrometers | 2300 |
| —CONH$_2$ | 2.91 micrometers | 460 |

Example 1

Comparative Example

A copolymer of TFE, HFP and VDF was prepared as follows: A polymerization kettle with a total volume of 47.5 l equipped with an impeller agitator system was charged with 29.01 deionized water; 2 g oxalic acid, 12 g ammonium oxalate and 252 g of a 30 weight % aqueous solution of perfluorooctanoate ammonium salt (FX 1006 of 3M Company, APFO). The oxygen free kettle was then heated up to 60° C. and the agitation system was set to 240 rpm. The kettle was charged with ethane to a pressure of 1.1 bar absolute, 847 g hexafluoropropylene (HFP) to a pressure of 8.4 bar absolute, with 253 g vinylidene fluoride (VDF) to 12.8 bar absolute and with 425 g tetrafluorethylene (TFE) to 16.8 bar absolute reaction pressure. The polymerization was initiated by the addition of 25 ml 1.31% aqueous potassium permanganate (KMnO$_4$) solution and a continuous feed of KMnO$_4$ solution was maintained with a feed rate of 60 ml/h. As the reaction starts, the reaction temperature of 60° C. was maintained and the reaction pressure of 16.8 bar absolute was maintained by the feeding TFE, VDF and HFP, into the gas phase with a feeding ratio HFP (kg)/TFE (kg) of 0.423 and a feeding ratio VDF (kg)/TFE (kg) of 0.820. When a total feed of 6610g TFE was reached in 185 min, the feed of the monomers was interrupted by closing the monomer valves. Within 10 minutes, the monomer gas phase was reacted down to a kettle pressure of 9.2 bar. Then the reactor was vented and flushed with N$_2$ in three cycles.

The so-obtained 42.8 kg polymer dispersion having a solid content of 33.8% and a latex particles having 112 nm in diameter according to dynamic light scattering was removed at the bottom of the reactor, passed through a glass column containing DOWEX 650C cation exchange resin (Dow Chemical Co.) and subsequently agglomerated and dried. The thus obtained 14.5 kg polymer is readily soluble in methylethylketone (MEK) and tetrahydrofuran (THF) and showed the physical characteristics listed below:

| | |
| --- | --- |
| melting point maximum: | 115° C. |
| MFI(265/5): | 8.5 g/10 min |
| zero shear viscosity at 265° C.: | 5.1 × 10$^3$ Pa * s |
| reduced viscosity (MEK@35° C.): | 92 ml/g |
| intrinsic viscosity (MEK@35° C.): | 88 ml/g |
| critical shear rate: | 38–54 s$^{-1}$ |

According to the procedure set forth in this example, polymers of the same composition but with different melt viscosities were produced. From the data obtained on these polymers, it was found that the critical shear rate $\gamma_c^*$ for these terpolymers is dependent of the MFI according to the formula:

$$\gamma_c^* = 4.07 \times MFI^{1.09} \qquad \text{eq. 1}$$

and that the zero shear viscosity $\eta_0$ is dependent on the intrinsic viscosity according to the formula:

$$\eta_0 = 1.04e-8 \times [\eta]^{5.98} \qquad \text{eq. 2}$$

Example 2

In this example, a terpolymer having the same composition as in comparative example 1, was produced essentially according to the procedure of example 1 but using the olefin BDFE. The kettle was charged with ethane to a pressure of 1.8 bar absolute and 790 g hexafluoropropylene (HFP) to a pressure of 8.5 bar absolute, the stainless steel cylinder with a total volume of 5.3 l used as feeding line for HFP was fully evacuated. After complete evacuation, the cylinder was charged with 400 mbar of BDFE, which corresponds to 12.3 g at room temperature according to the ideal gas law. Then the cylinder was rapidly charged with 2850 g HFP in order to ensure a sufficient dispersion of BDFE into HFP under turbulent flow conditions. The rest of the polymerization was conducted in the same manner as described in example 1. The polymerization took 170 min to obtain polymer dispersion having a solid content of 33.8% and a latex particles having 110 nm in diameter according to dynamic light scattering. The physical characteristics of the polymer worked up in the same manner as described in example 1 are listed below:

| | |
|---|---|
| melting point maximum: | 115° C. |
| MFI(265/5): | 8.6 g/10 min |
| zero shear viscosity at 265° C.: | $1.4 \times 10^4$ Pa · s |
| reduced viscosity (MEK@35° C.): | 77 ml/g |
| intrinsic viscosity (MEK@35° C.): | 74 ml/g |
| critical shear rate: | 75–105 $s^{-1}$ |

A terpolymer with MFI 8.6 produced as described in example 1 has a critical shear rate of $\gamma_c^* = 42 s^{-1}$ as can be calculated from the above stated equation 1. The terpolymer made according to the process of the invention as illustrated with this example thus has a critical shear rate that is 2 to 2.5 fold higher. The extruded strands are not discolored and no bromine can be detected from the polymer in the elemental analysis conducted by Wickbold-incineration.

Contrary to the terpolymer of example 1, the polymer sample of this example shows a distinct inflexion point of the phase angle $\delta$ as obtained by dynamic mechanical measurement plotted as a function of frequency $\omega$. Moreover, the $1^{st}$ derivative function ($d\delta/d\omega$ plotted versus $\omega$) passes maximum and $2^{nd}$ derivative function ($d^2\delta/d\omega^2$ plotted versus $\omega$) passes zero at 21 rad/s indicating the phase angle at gel point to be $\delta_c = 54°$ (corresponding the relaxation exponent to be n=0.60). The gel stiffness S was calculated to be $3.4 \times 10^3$ Pa.$s^n$.

Example 3

Figure 2:
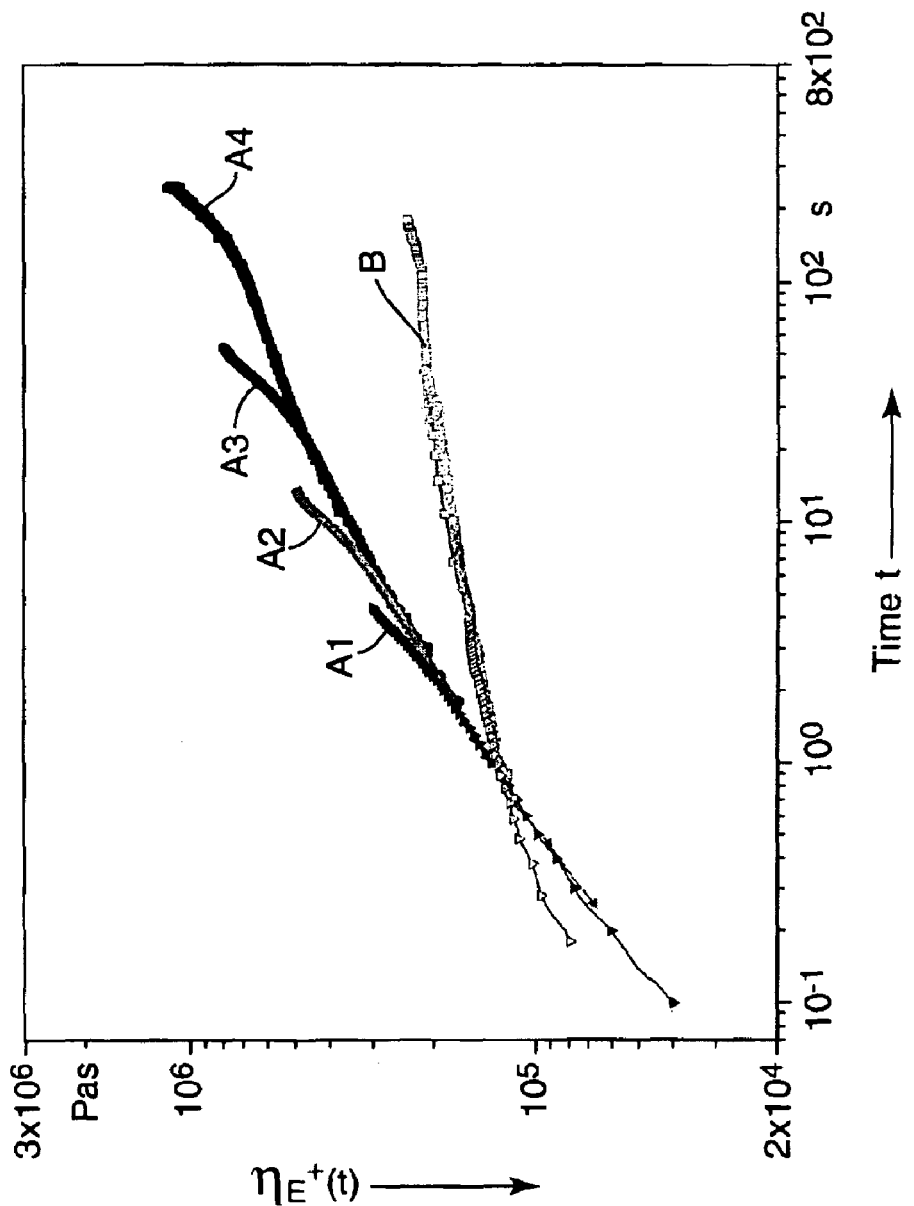
FIG. 2 is a graphical representation of elongation rates versus time for several polymers.

The polymers of examples 1 and 2 were investigated at 170° C. in terms of their strain hardening behavior using a Münstedt elongational rheometer (described above). At 170° C., the semicrystalline terpolymer is completely melted. The elongational viscosity for both samples as a function of elongational rate and time was investigated. In FIG. 2, curves A1 to A4 represent the behavior of the polymer of example 2 at different elongational rates of respectively 0.5, 0.2, 0.05 and 0.01 and curves B represent the behavior for the polymer of example 1 whereby the curves at different elongational rates collide with each other. As can be seen from FIG. 2, in the whole regime of elongational rates and time, the elongational viscosity of the comparative polymer of example 1 describes a curve which is typical for the initial phase of a creep experiment. There are no implications of strain hardening.

At low times, the elongational viscosities of the polymer example 2 also describes a curve which is typical for the initial phase of a creep experiment but beyond this, the polymer of example 2 shows a completely different behavior. At higher times, strain hardening becomes evident at all elongational rates investigated.

Examples 4 to 7

In analogy to example 2, a set of samples was produced with different amounts of ethane to vary the molecular weight and with different amounts of BDFE to vary the degree of LCB. The amounts of ethane chain transfer agent and BDFE are summarized in table 1. The other experimental conditions as well as the work up was the same as for example 2. The test results are also reported in table 1. Note that all these polymer samples show a remarkably smaller intrinsic viscosity [$\eta$] (which is indicative for the excluded volume) determined by means of solution viscosimetry as expected from the zero shear viscosity $\eta_0$ determined from the melt.

TABLE 3

| | Example 4 | Example 5 | Example 6 | Example 7 |
|---|---|---|---|---|
| $p_{BDFE}$ [mbar] | 50 | 140 | 410 | 420 |
| $m_{BDFE}$ [g] | 1.5 | 4.4 | 12.5 | 13.1 |
| $P_{ethane}$ [bar] | 1.5 | 1.5 | 1.05 | 2.2 |
| $\eta_0$(265° C.) [Pa · s] | $2.8 \times 10^3$ | $5.7 \times 10^3$ | $8.5 \times 10^5$ | $1.0 \times 10^3$ |
| MFI(265/5) [g/10'] | 16.4 | 12.8 | 0.8 | 55 |
| [$\eta$] [ml/g] | 78 | 74.5 | 102 | 56 |
| phase angle $\delta_c$ [°] | 84 | 66 | 39 | 72 |
| relax. exponent n [1] | 0.92 | 0.73 | 0.43 | 0.80 |
| gel stiffnes S [Pa · $s^n$] | $1.8 \times 10^2$ | $1.3 \times 10^3$ | $2.3 \times 10^4$ | $2.7 \times 10^2$ |
| critical shear rate [$s^{-1}$] | 75–105 | 75–105 | 10–14 | 405–794 |

Example 8

In this example it is demonstrated with the preparation of FEP using the olefin BDFE, that the beneficial rheology properties originating from long chain branching remained after the post-fluorination step of a perfluorinated polymer. A polymerization kettle with a total volume of 53 l equipped with an impeller agitator system was charged with 30.0 l deionized water and 240 g of a 30 weight % aqueous solution of perfluorooctanoate ammonium salt (FX 1006 of 3M Company, APFO). The oxygen free kettle was then heated up to 70° C. and the agitation system was set to 210 rpm.

The polymerization kettle was first charged with 1750 g hexafluoropropene (HFP) to a pressure of 11 bar absolute, then the stainless steel cylinder with a total volume of 3.87 l used as feeding line for HFP was fully evacuated (150 mbar abs). After complete evacuation, the cylinder was charged to a pressure of 1.35 bar absolute with bromodifluoroethene (BDFE), which corresponds to 26.6 g at room temperature according to the ideal gas law. Then the cylinder was rapidly charged with 1290 g HFP in order to ensure a sufficient dispersion of BDFE into HFP under turbulent flow conditions. The polymerization was initiated by the addition of 38 g ammonium peroxodisulfate (APS) in 100 ml deionized water. As the reaction starts, the reaction temperature of 70° C. was maintained and the reaction pressure of 17 bar absolute was maintained by the feeding TFE and HFP into the gas phase with a feeding ratio HFP (kg)/TFE (kg) of 0.11. When a total feed of 10 kg TFE was reached in 275 min, the feed of the monomers was interrupted by closing the monomer valves. Then the reactor was vented and flushed with $N_2$ in three cycles.

The so-obtained 40.6 kg polymer dispersion having a solid content of 27.9% and latex particles having 82 nm in diameter according to dynamic light scattering was discharged. After coagulation of the latex with hydrochloric acid, the polymer was agglomerated with gasoline, washed several times with deionized water and dried. The dried polymer agglomerate was treated with elemental fluorine gas in a stainless steel fluorination reactor equipped with a gas inlet, a vent connection and a steam heating mantle. The polymer agglomerates were placed in the reactor, which was then sealed and the polymer was heated to 120° C. A vacuum was applied to the reactor to remove all air. The reactor was repressurized with nitrogen. This was repeated ten times, then a mixture of fluorine and nitrogen (10/90 volume %) was used to repressurize to 1 bar absolute. After 30 min the reactor was evacuated and repressured with the nitrogen/fluorine mixture. This was repeated 10 times. During the whole time, the temperature was maintained to 120° C. After the end of the fluorination, the reactor was purged several times with nitrogen to remove the fluorine and the polymer was cooled. The physical characteristics of the polymer are listed below:

| | |
|---|---|
| melting point maximum: | 257° C. |
| MFI(372/5): | 13.4 g/10 min |
| zero shear viscosity at 372° C.: | $4.6 \times 10^3$ Pa * s |
| relaxation exponent (n): | 0.77 |
| gel stiffness (S): | 886 Pa * $s^n$ |
| critical shear rate: | 105–148 $s^{-1}$ |
| number of end groups prior to post-fluorination: | $331/10^6$ C atoms |
| number of end groups after post-fluorination: | $27/10^6$ C atoms |

What is claimed is:

1. A composition comprising a fluoropolymer that is melt-processible and thermoplastic and that has a melting point between 100° C. and 320° C., said fluoropolymer having long chain branches and being derived from (a) one or more gaseous fluorinated monomers, (b) one or more modifiers selected from (i) olefins having a bromine or iodine atom bonded to a carbon of the double bond of the olefin, (ii) olefins corresponding to formula (I):

$$X^a{}_2C=CX^a—R_f—Br \qquad (I)$$

wherein each $X^a$ independently represents hydrogen, fluorine, bromine, chlorine or iodine, $R_f$ is a perfluoroalkylene group, a perfluorooxyalkylene group or a perfluoropolyether group and (iii) mixtures thereof; and (c) optionally one or more comonomers selected from non-gaseous fluorinated monomers and non-fluorinated monomers.

2. A composition according to claim 1, wherein said gaseous fluorinated monomers are selected from tetrafluoroethylene, vinylidene fluoride, chlorotrifluoroethylene, hexafluoropropylene, perfluorovinyl ethers and mixtures thereof.

3. A composition according to claim 1 wherein said olefin having a bromine or iodine atom bonded to a carbon of the double bond of the olefin corresponds to the general formula:

$$X_2C=CXZ \qquad (I)$$

wherein each X may be the same or different and is selected from the group consisting of hydrogen, F, Cl, Br and I, with the proviso that at least one X represents Br or I, Z represents hydrogen, F, Cl, Br, I, a perfluoroalkyl group, a perfluoroalkoxy group or a perfluoropolyether group.

4. A composition according to claim 1 wherein X is selected from hydrogen, F and Br with the proviso that at least one X represents Br and Z is hydrogen, F, Br, a perfluoroalkyl group or a perfluoroalkoxy group.

5. A composition according to claim 1 wherein said fluoropolymer is a perfluorinated polymer.

6. A composition according to claim 1 wherein said fluoropolymer comprises units deriving from tetrafluoroethylene and hexafluoropropylene or comprises units deriving from tetrafluoroethylene and a perfluorinated vinyl ether.

7. A method comprising extruding a fluoropolymer as defined in claim 1.

8. A method according to claim 7 wherein said fluoropolymer is extruded as a coating onto a wire or a cable.

9. Method for making a fluoropolymer that is melt-processible and thermoplastic and that has a melting point between 100° C. and 320° C., comprising polymerization (a) one or more gaseous fluorinated monomers with (b) one or more modifiers selected from (i) olefins having a bromine or iodine atom bonded to a carbon of the double bond of the olefin, (ii) olefins corresponding to formula (I):

$$X^a{}_2C=CX^a—R_f—Br \qquad (I)$$

wherein each $X^a$ independently represents hydrogen, fluorine, bromine, chlorine or iodine, $R_f$ is a perfluoroalkylene group, a perfluorooxyalkylene group or a perfluoropolyether group and (iii) mixtures thereof; and (c) optionally one or more comonomers selected from non-gaseous fluorinated monomers and non-fluorinated monomers, whereas the amounts of said gaseous fluorinated monomers and optional comonomers are selected such so as to obtain a melt-processible thermoplastic fluoropolymer having a melting point between 100 and 320° C. and wherein said one or more modifiers are used in an amount of not more than 0.3% by weight based on the total weight of monomers fed to the polymerization.

10. Method according to claim 9 wherein the resulting fluoropolymer is a perfluoropolymer and wherein subsequent to the polymerization, the resulting perfluoropolymer is subjected to a fluorination step.

* * * * *

UNITED STATES PATENT AND TRADEMARK OFFICE
CERTIFICATE OF CORRECTION

PATENT NO. : 6,927,265 B2
DATED : August 9, 2005
INVENTOR(S) : Kaspar, Harald

It is certified that error appears in the above-identified patent and that said Letters Patent is hereby corrected as shown below:

Column 1,
Lines 22-23, "described in "Modem Fluoropolymers" should be -- described in "Modern Fluoropolymers" --.

Column 13,
Line 52, "Mu nstedt elongational rheometer" should be -- Münstedt elongational rheometer --.

Column 16,
Lines 27, "comprising polymerization (a)" should be -- comprising polymerizing (a) --.

Signed and Sealed this

Third Day of January, 2006

JON W. DUDAS
*Director of the United States Patent and Trademark Office*